United States Patent
Zagaynov et al.

(10) Patent No.: US 9,256,922 B2
(45) Date of Patent: Feb. 9, 2016

(54) APPLYING SUPER RESOLUTION FOR QUALITY IMPROVEMENT OF OCR PROCESSING

(71) Applicant: ABBYY Development LLC, Moscow (RU)

(72) Inventors: Ivan Zagaynov, Moscow Region (RU); Vasily Loginov, Moscow (RU)

(73) Assignee: ABBYY Development LLC (RU)

( * ) Notice: Subject to any disclaimer, the term of this patent is extended or adjusted under 35 U.S.C. 154(b) by 118 days.

(21) Appl. No.: 14/137,913

(22) Filed: Dec. 20, 2013

(65) Prior Publication Data

US 2014/0369556 A1    Dec. 18, 2014

(51) Int. Cl.
G06K 9/00 (2006.01)
G06T 3/40 (2006.01)

(52) U.S. Cl.
CPC .......... *G06T 3/4053* (2013.01); *G06K 2209/01* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,924,310 A * | 5/1990 | von Brandt | ............... | 375/240.16 |
| 4,979,136 A * | 12/1990 | Weiman et al. | ............... | 382/169 |
| 5,838,839 A * | 11/1998 | Seki et al. | ............... | 382/299 |
| 6,633,303 B2 * | 10/2003 | Nakajima | ............... | 345/629 |
| 7,031,553 B2 * | 4/2006 | Myers et al. | ............... | 382/289 |
| 7,227,557 B2 * | 6/2007 | Nakajima | ............... | 345/629 |
| 7,620,268 B2 | 11/2009 | Myers et al. | | |
| 7,953,295 B2 | 5/2011 | Vincent et al. | | |
| 8,031,940 B2 | 10/2011 | Vincent et al. | | |
| 8,098,934 B2 | 1/2012 | Vincent et al. | | |
| 8,285,080 B2 | 10/2012 | Mizuno | | |
| 8,289,403 B2 | 10/2012 | Dobashi et al. | | |
| 2004/0046768 A1 * | 3/2004 | Nakajima | ............... | 345/619 |
| 2011/0128385 A1 * | 6/2011 | Bedros et al. | ............... | 348/164 |
| 2013/0039570 A1 | 2/2013 | Vincent et al. | | |
| 2013/0040660 A1 * | 2/2013 | Fisher et al. | ............... | 455/456.1 |

* cited by examiner

*Primary Examiner* — Anand Bhatnagar
(74) *Attorney, Agent, or Firm* — LeighAnn Weiland; Veronica Weinstein (57) ABSTRACT

Systems and methods for improving the quality of recognition of the object based on a series of frame images of objects are described herein. A plurality of images depicting the same object are received. A first image is selected from the plurality of images. The first image may be an image with the highest quality from plurality of images. For each image in the plurality of images, motion estimation of elements of an image in the plurality of images and the first image is performed. Based on the results of motion estimation, motion compensation and signal accumulation of the object in the images in the plurality of images using the first image are performed. A high resolution image of the object obtained based on the motion compensation and signal accumulation is generated. Character recognition on the resulting high resolution image is performed.

41 Claims, 5 Drawing Sheets

APPLYING SUPER RESOLUTION FOR QUALITY IMPROVEMENT OF OCR PROCESSING

CROSS-REFERENCE TO RELATED APPLICATIONS

This application claims priority under 35 USC 119 to Russian patent application No. 2013127165, filed Jun. 14, 2013, the disclosure of which is incorporated herein by reference.

BACKGROUND

The present disclosure relates generally to document image processing, computer vision and video analysis.

Computing devices (e.g., smartphones, mobile phones, laptops, tablet computers, notebooks, personal digital assistants, etc.) are becoming increasingly available worldwide. Moreover, computing devices are becoming more portable and more powerful. These devices are always at hand and their capabilities are comparable with those of a personal computer (PC). Computing devices have become indispensable assistants in business, education, communication, in travel and in everyday life, especially for capturing images, because almost all of these devices include a camera built into them. Various software applications, available for installation on the computing device, may provide methods and means of processing captured images or recorded video received from a mobile camera. Some of these applications may include features related to optical or intelligent character recognition (OCR or ICR) exist.

During the process of character recognition, a common situation arises when the input image does not have enough resolution for the text to be easily recognized. Low resolution source images may be caused by various reasons such as: limited resolution of the camera matrix built into the electronic device, lack in the optical system of an electronic device, data encryption algorithms, insensitive or crude compression algorithms. The imperfections in the use of a mobile camera such as hands shakes and non-ideal light conditions may cause defects in the captured images. Optical distortion and motion blur can be caused by limited shutter speed. Noise, aliasing effects, defocusing, and glares can negatively impact image quality. These shortcomings often interfere with subsequent processing of the images.

SUMMARY

An exemplary embodiment relates to method for improving the quality of recognition of the object based on a series of frame images of objects. The method includes receiving a plurality of images, each image depicting same object. The method further includes selecting a first image from the plurality of images. The method further includes estimating motion of elements of the object in the first image relative to images in the plurality of images. The method further includes based on results of motion estimation, performing motion compensation of elements of the one or more objects using the first image for the images in the plurality of images. The method further includes accumulating signal from the compensated images into the first image resulting in a high resolution image. The method further includes performing object recognition using the resulting high resolution image.

Another exemplary embodiment relates to a system. The system includes one or more data processors. The system further includes one or more storage devices storing instructions that, when executed by the one or more data processors, cause the one or more data processors to perform operations comprising: receiving a plurality of images, each image depicting same object; selecting a first image from the plurality of images; estimating motion of elements of the object in the first image relative to images in the plurality of images; based on results of motion estimation, performing motion compensation of elements of the one or more objects using the first image for the images in the plurality of images; accumulating signal from the compensated images into the first image resulting in a high resolution image; and performing object recognition using the resulting high resolution image.

Yet another exemplary embodiment relates to computer readable storage medium having machine instructions stored therein, the instructions being executable by a processor to cause the processor to perform operations comprising: receiving a plurality of images, wherein each image same object; selecting a first image from the plurality of images; estimating motion of elements of the object in the first image relative to images in the plurality of images; based on results of motion estimation, performing motion compensation of elements of the one or more objects using the first image for the images in the plurality of images; accumulating signal from the compensated images into the first image resulting in a high resolution image; and performing object recognition using the resulting high resolution image.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

A substantial need exists for exact or highly accurate results from document image processing, such as optical character recognition (OCR) and intelligent character recognition (ICR). Techniques described herein include enhancing the results of optical character recognition (OCR) or intelligent character recognition (ICR) based on analyzing and processing a set of input images. In these types of applications, there is always a demand for increasingly higher quality and resolution of images. Detailed resolution of the subject matter in images is crucial for performance of computer processing methods including OCR and ICR.

A portable device may allow for acquisition of several low resolution images of the same scene. For example, a user can use a mobile device's camera to capture images of a page of a book while visiting a library. Such photographs may include crucially important information for the user. In another example, a user may desire to capture contact information of business partners or colleagues from a set of business cards. Images that include text that are captured by the camera of a mobile device may have one or more different types of defects, especially in poor lighting conditions. This situation can make any subsequent recognition process (e.g., OCR) impossible. In other situations, a user does not always have the leisure to capture a series of images of the same document. In such situation, a user may decide instead to record a short video of the document. In this situation, the short video may be made up of a series of images of the object of interest—typically a document that includes text.

According to various embodiments disclosed herein, a high resolution image is generated based on a set of distorted or low resolution images (or video). The generated high resolution image may be processed by OCR or ICR application for more accurate recognition of text or other type of object recognition. In particular, the described techniques enhance the quality of recognition results of an image that includes text based on recovering a high resolution image from a set of distorted and/or low-resolution images or set of video frames. The set of images or video frames may be acquired by a camera of an electronic device.

At first, one or more images of text (e.g., business cards, invoices, license plates on a vehicle, signs, a page of a book) or other content are acquired by camera application built into the electronic device and may be stored in a memory of the device or stored in remote location by using a transport or network protocol. Alternatively, a video sequence of frames or set of images may be recorded in advance or downloaded from one or more external sources (e.g., Internet, memory card, another electronic device) into memory storage of the electronic device in use. Due to the low resolution of the captured images (or frames in a video sequence), most of them are inappropriate candidates for subsequent processing, for example for OCR or ICR. Many document images acquired by a camera embedded in a computing device may also contain different kinds of defects such as blur, noise, defocusing, glare, etc. These defects often cause errors in recognition, so the captured images may be unacceptable when the goal is to achieve highly accurate recognition of the text in the document images.

Generally, for purposes of recognizing text in a photographic image, an electronic device may include OCR algorithms, technology or functionality. OCR functionality may be installed locally on the electronic device or may be operated and made available at one or more accessible servers or computing devices and it may be accessible via a network, or one or more standards and communication protocols including, but not limited to, WiFi®, Zigbee®, Bluetooth®, etc.

An OCR system may be used to transform images or representations of paper documents (photos) into computer-readable and computer-editable and searchable electronic files. The OCR system may include an imaging device or component that produces a document image, and a component or software that processes the image or images. The OCR system may include a set of computer algorithms that can recognize symbols, letters, characters, digits, and other units and save them into a computer-editable format (i.e., an encoded format).

For example, a user may wish to get on their electronic device an image of a business card that lies on a table for subsequent text recognition, extraction, and storage of information in the memory of the electronic device. The user may have at least two available options. One option may involve sequential shots of the same scene (in this example, the scene is a text document). Capturing of the sequential shots may involve some displacement (or movement) of the camera from frame to frame (may be referred to as relative frame motion). Another option may involve recording a video which containing the necessary document.

In a video or sequence or set of photographs, it is assumed that an object of interest (scene) differs slightly in appearance from frame to frame. Changes in distortion of the text document (e.g., business card) may be considered negligible when capturing images or video of the object on a solid, stable surface (e.g., on the table). Negligible distortions also may be caused by surface imperfections or defects of the object of interest (e.g., wrinkles, spots, scratches). Such imperfections do not change substantially during transition from one frame (or captured image) to another. Imperfections may be included in each image or frame. The subject matter from one video frame or image to the next video frame or image is referred to as the "scene" of the object of interest.

The movement in the scene may be primarily due to the camera motion of the electronic device in the hands of a user. The movement caused by shaking of user hands during image or video capturing may be compensated by one or more algorithms of stabilization or by mechanical stabilization.

Figure 2:
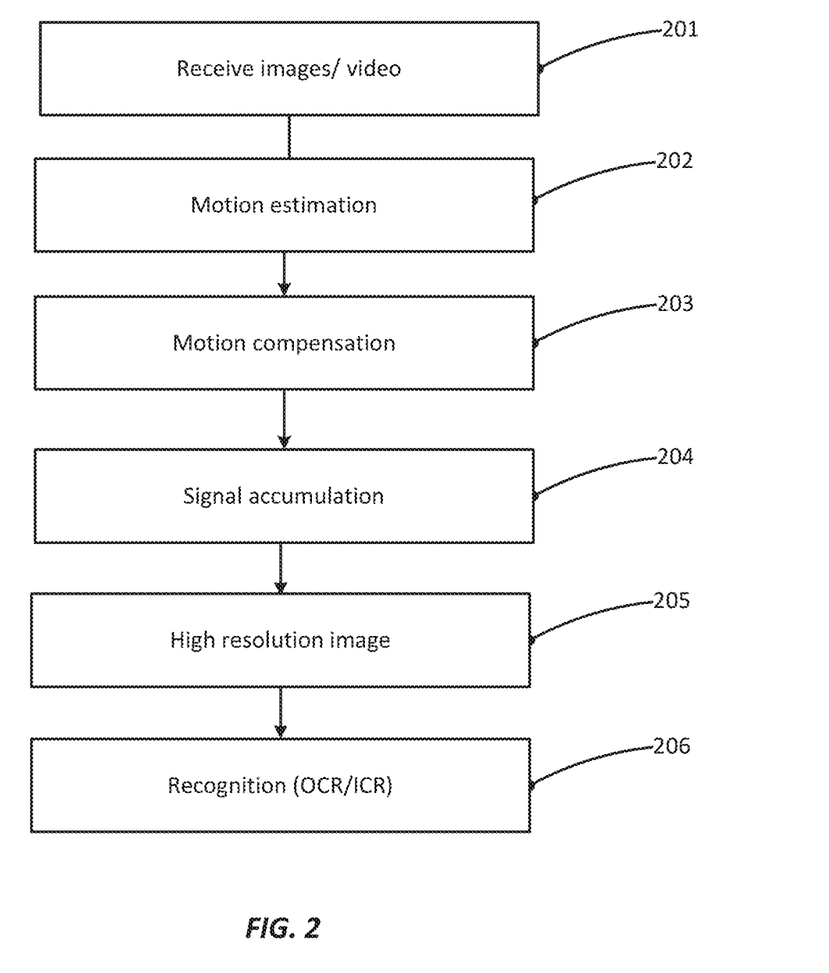
FIG. 2 is a flowchart of a process for increasing resolution of a plurality of images captured by an electronic device for improved subsequent character recognition, in an accordance with an example implementation.

In one embodiment, a series of frames (or images) containing a single object of interest, or a scene (e.g., the scene is a document containing textual information) are captured or acquired by a computing device (step 201 of FIG. 2). The acquired images (or frames) may contain different types of distortions (e.g., blur, defocusing, glare, etc.) and may be of low resolution. The acquired distorted low resolution images are processed using signal processing techniques in order produce a high resolution image (or at least, producing an image that has higher resolution than the acquired images). Since sequence of frames in video signal may be considered to be a set of images, the method described herein can be applied to video sequence of frames of video signal (e.g., video sequence of the document). The generated output high-resolution document image may undergo optical (or intellectual) character recognition. As a result, the results of recognition may become more accurate due to increased image resolution.

Methods of image enhancement or image reconstruction having a high resolution may be based on analysis of one or several sets of images showing the same scene, where the scene may include a wide variety of depicted objects. For example, the scene may include people, nature, architecture, etc. The techniques described herein are intended especially for processing text images that include textual information, symbols, characters, etc. For example, such documents may be business cards, checks, text documents, bills, application forms, etc. The image of the document may include text blocks, tables, separators, diagrams, charts, stamps, etc. These types of documents may be characterized by a piecewise constant signal model. That means that a signal includes considerable areas of the background and areas with the step signal for text (for a text block, for example).

Figure 1:
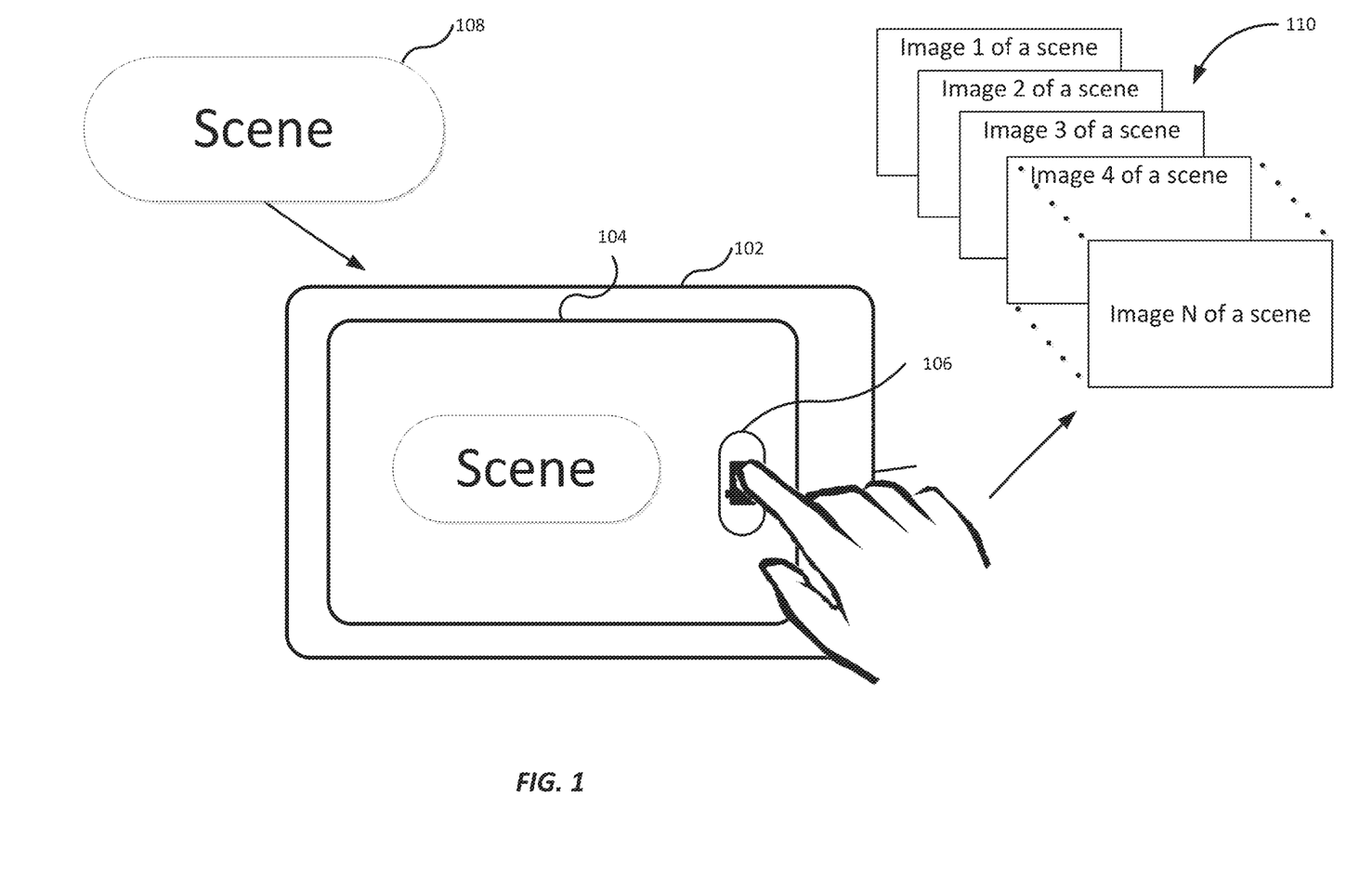
FIG. 1 is a diagram illustrating capturing a set of images of a scene using an electronic device, in an accordance with an example implementation.

Referring to FIG. 1, an electronic device 102 capturing an image or recording a video of a scene 108 is shown. The electronic device 102 includes a display screen 104 and a camera button (real or virtual) 106 for initiating and performing camera recording (or video recording) of the scene 108. The scene 108 may include textual documents such as business cards, checks, bills, application forms, etc. The digital representation of the scene 108 on the screen 104 may be captured and recorded by a camera, embedded in the electronic device 102. As a result, a series of N images (or frames) 110 of the scene 108 may be stored in the memory 504 of the electronic device 102. Contents displayed on the screen of the electronic device 102 can be obtained by using the camera viewfinder, which transmits a document image on the display screen 104.

The electronic device 102 may be a mobile phone, smartphone, cell phone, digital camera, tablet computer, laptop computer or any other gadget or combination of devices including those that have a screen and/or camera, or provide access to images or to component/device generating images. A camera embedded into an electronic device may allow for capturing information into a digital form. The information in the scene may be in paper form (e.g., magazine, book, newspaper), or on a screen of another device.

FIG. 2 illustrates a flowchart of a process for recovering a relatively high resolution or improved image from a set of distorted and low resolution images (or scene) for enhanced quality of subsequent recognition. At block 201, digital representation of a scene is acquired (received or loaded) by an electronic device (e.g., in the form of a series of images or frames of video sequence).

Once the images or video frames are acquired or received, the series of images or frames of video 110 are analyzed. At step 202, the movement of the scene (or object of interest) from one image to another (or from one vide frame to another) may be estimated as precisely as possible. The method describing the movement of objects in the transition from one image to another image (or from one frame to another adjacent frame) is referred to as motion estimation herein. To perform motion estimation, one or more motion models may be utilized.

In one embodiment, the captured images or video frames may be partitioned into non-overlapping blocks of pixels, thereby forming a matrix of macro blocks such that the analyzed images are divided into a grid. The parameters associated with the pixel blocks (e.g., width and length) may be predetermined or pre-calculated. In on implementation, the macro blocks of pixels are square (e.g., squares of 16×16 pixels). The macro blocks may be of another shape or size. The macro blocks may be of different sizes in different portions of any given image, or may be of different sizes from image to image in a sequence of images.

The process of analyzing the acquired images (or frames of video) is performed pairwise. That is, at every moment t, two images are compared relative to each other and processed in the manner described herein. As a result of the pairwise analysis, one resulting output image is generated. This resulting output image accumulates information from the two previously processed images. In one implementation, the first image (or frame) in a series of images may be considered an accumulator image. The accumulator image may accumulate information from previously processed images. When the first two images in the series of images are processed, the first image accumulates information from the second images. Next, the image-accumulator (e.g., the first image from the series of images) from the previous step and the third acquired image in the series of images are analyzed to add information from the third image to the image-accumulator. This process is repeated until all the images in the series of images are processed. For convenience, two images analyzed at some moment t may be denoted or referred to as a current image (or frame) and a reference image (or frame). The reference image (frame) may be previous image or subsequent image in time.

After partitioning the analyzed images (frames) into a grid, the macro blocks of a current image are compared to corresponding macro block of a reference image and the corresponding macro block's closest (e.g., adjacent) neighboring blocks to calculate a set of motion vectors. A motion vector represents or is an estimate of a real movement of the block between two (consecutive) images or frames. A motion vector may be obtained from a large number of all possible candidates for a motion vector. The number of motion vector candidates depends on a search area in the current image. The larger the search area in the current image, the larger the number of motion vector candidates for the processed block of pixels in the reference image (or frame). The calculated motion vectors for each macro block describe the shift or "motion" of a block of pixels of a current image from one location to another in the reference image (frame). This shift computed for all the macro blocks in an image (frame) constitutes an estimate of motion or movement in the currently analyzed frame.

From all the candidates of motion vectors for a macro block, one motion vector is selected which provides the best block matching in accordance with one of the selected evaluation metrics. For this purpose, various block matching algorithms (BMA) may be applied. For example, one or more of the following BMA's may be utilized: Spiral Search, Cross Search Algorithm (CSA), Three Step Search, Full Search Algorithm (FSA), Two Dimensional Logarithmic Search (TDL), or another BMA.

According to some embodiments, to reduce computational costs of an algorithm, a multi-scale method for searching motion vectors may be used. The multi-scale method for searching for motion vectors may include computing pyramids of multi-scale representation of the image (e.g., the Gaussian pyramids) for images (or frames). These pyramids may produce images with resolution reduced in half (or quarter, etc.). Corresponding blocks in these reduced-sized images have correspondingly smaller sizes and correspondingly smaller motion vectors. As a result, for finding an approximate value of the motion vectors may require less computing of the metric differences (i.e., quality metric evaluations). After a preliminary assessment of the motion vectors within the images having low resolution (e.g., originally captured images), the motion vectors may be increased by two (or by any other factor) and adjusted (or refined) for blocks within an image with a higher resolution by evaluating possible candidates in an area (e.g., a small area) neighboring these blocks. The process of refinement is repeated (e.g., through different scales) until refinement on the image is produced in the original scale.

The matching algorithms may describe the process of matching of a block from a current image with a corresponding block from a reference image. Block matching may be based on the output value of an evaluation metric, or, in other words, of some cost function. The utilized evaluation metrics may include, but are not limited to, a Mean Squared Error (MSE), a Sum of Absolute Differences (SAD), a Mean Absolute Difference (MAD), a Sum of Squared Errors (SSE), a Sum of Absolute Transformed Differences (SATD), etc. For example, a Mean Squared Error (MSE) or a Mean Absolute Difference (MAD) may be used. The equations for MSE and MAD calculation are as follows:

$$MSE = \frac{1}{N^2} \sum_{x=1}^{N} \sum_{y=1}^{N} (I_C(x, y) - I_R(x, y))^2$$

$$MAD = \frac{1}{N^2} \sum_{x=1}^{N} \sum_{y=1}^{N} |I_C(x, y) - I_R(x, y)|$$

where IC (x,y) and IR (x,y) are intensities of pixels that are processed in a Current block and in a Reference block, respectively, where N is the size (in pixels) of a block in a grid (e.g., N=4 for a 4×4 block of pixels).

A block in a current image, which has the lowest evaluation metric value, may most closely match a corresponding block in a reference image. For example, in accordance with the described evaluation method, from all the candidates for motion vectors, a motion vector with the lowest evaluation metric value of MSE may be selected.

Even though evaluation metrics (or cost function) are used to select motion vectors, some of the selected motion vectors may be selected erroneously. To remove these erroneously selected or identified motion vectors from the consideration and analysis, all (or at least some) motion vectors may be tested or validated. Various reliability criteria may be applied to macro blocks, each of which has their own motion vectors. Some of the reliability criteria are discussed below.

$$Var(I) \geq k\sigma \quad (1)$$

The above-listed formula (1) represents that the variance of pixel intensity I of an analyzed block cannot not be less than the threshold value, which determines a noise level (kσ), where k is an adaptive parameter, which may be determined empirically for every type of camera having unique optical characteristics.

Due to specifics of a scene of interest containing text and characters, a large number of blocks or regions in an image or frame may contain only background. The term "block only containing background" means that the block doesn't contain text or other characters, and has relatively uniform color of filling. Macro blocks that only contain background need to be removed from subsequent analysis. The reason for removing these blocks from analysis is that after removal of blocks only containing background; the resulting field of motion vectors becomes smoother. Otherwise, the subsequent interpolation of motion vectors for every point may be erroneous. Thus, only "reliable" blocks with text or characters should be processed during the subsequent analysis.

Another reliability criterion, which utilizes the motion coherence property of a textual document (image) may be represented as following inequality:

$$|V_C - \langle V \rangle| < T, \quad (2)$$

where $V_C$ is a motion vector of a currently analyzed block; $\langle V \rangle$ is an average vector of adjacent neighboring blocks of the current block; T is a predetermined threshold value. This formula means that motion vector of the currently analyzed block $V_C$ must not differ too much from the average motion vector of the adjacent neighboring blocks $\langle V \rangle$ by a value that exceeds the predetermined threshold T.

If macro blocks and motion vectors don't satisfy the described above reliability criteria, these blocks may considered to be <<unreliable>> and may be removed from the subsequent analysis of the image (or frame).

The detection of <<unreliable>> blocks may take into account the type of the analyzed image (or frame). There may be considerable difference between processing of photographic images depicting a scene with people, nature, or architecture, as compared to processing of the scenes having textual information. The methods and systems described herein may be applied to scenes containing text, symbols, numbers, characters, or other types of information. Images containing text may be represented using the piecewise constant signal, which may be more appropriate for images of such type. The signal (function) contains considerable background areas (paper), and areas with the step signal (text). The use of reliability criteria (1) and (2) may be justified by the specifics of the scene (text document) containing textual information. Therefore, the reliability criteria may provide a more accurate motion estimation and motion compensation, which distinguishes this method from other methods used to process the scene photos or videos where the objects of interest are people, nature, architecture, etc.

To reduce the possibility of errors during motion estimation between frames, macro blocks located on the edge of the image along the image perimeter may be considered "unreliable" and removed from the subsequent analysis. These boundary blocks may have considerable optical distortions caused by significant shifts in the scene, which may cause significant errors in motion estimation between images (or frames). A "band" along the perimeter of the image with a width of one or more blocks may be removed from further analysis. For example, depending on the type of the image, the width of this band may be between 5 and 10 blocks (or any other number of blocks). The boundary blocks, alone or in combination with the "band" of blocks may be removed from further analysis. Thus, in some embodiments, the processes of motion estimation and block matching may be performed based on inner image blocks.

The analysis of the blocks may be performed using the "reliable" macro blocks. The information in the "reliable" macro blocks may be interpolated on a portion of an image, from which "unreliable" blocks were removed. Square areas (referred to as "windows" herein) are constructed from macro blocks in such manner that <<unreliable>> blocks with missing (undetermined) values of motion vectors lie in the center of these windows (may be referred to as centered windows). The vector components in missed central <<unreliable>> block within a window (for example, the window with size 3×3 blocks) are computed using vector components of adjacent neighboring "reliable" blocks in an iterative manner. For example, the vector components of the central removed block may be computed as the average value of all vector components of the corresponding surrounding "reliable" neighboring blocks. If the surrounding neighboring blocks are also considered "unreliable", then the vector component in the removed central "unreliable" block remains unchanged. The described above method may be performed in an iterative manner until all image portions from which "unreliable" blocks were removed are assigned vector values computed using the adjacent "reliable" blocks.

As a result, a field of motion vectors, describing two dimensional transitions for each block, is determined for the current image and for the reference image. The field of selected motion vectors may be noisy. Thus, motion vector field may be smoothed. The smoothing may be performed independently for each component of a motion vector. To remove noise from the field of motion vectors, various types of filters may be used (e.g., convolution with the centered window of a large size). Such type of convolution may implicitly take into consideration the motion model of the scene, in which the object of interest is a textual document. In some embodiments, the motion vectors of adjacent neighbor blocks should not differ greatly.

After performing motion estimation between two images (frames), a process of compensation (step 203) of motion of a second image (or frame) to a first (reference or accumulator image) image (frame) is performed, thereby producing a new image compensated for motion relative to the reference (or accumulator) image. However, if the process is performed in a blockwise manner, discontinuities at the borders between blocks may be present (i.e., block artifacts may be present). The "block artifacts" may be represented by sharp vertical and horizontal edges, which may be detected (e.g., by human eyes). To avoid this disadvantage of the block motion estimation, bilinear interpolation for the motion vector field may be used. Values of motion vectors computed for corresponding blocks are interpolated for certain pixels within the image using bilinear interpolation.

In another embodiment, another motion model may be used. The motion model may use motion vectors determined only based on reliable blocks. Motion vectors may be computed in accordance with a method described above. According to another motion model, the motion in a scene may be described by perspective transformation. The parameters for this kind of transformation may be determined. As a result, the motion vectors determined based on "reliable" blocks form an overdetermined system of nonlinear equations, solution of which is an optimal parameter vector of perspective transformation. The Levenberg-Marquardt algorithm (LMA) may be used for solving this system of equations. An initial vector of parameters is assigned an identity map (or transformation), which may significantly speed up the search. The resulting perspective transformation parameters determine the motion vector for each image pixel. Whether the perspective transformation model is used may be determined based on the specifics of the scene of interest (e.g., a text document on a hard surface). When the perspective transformation model is used, the motion in the image is caused only by movement of a camera used to capture the image. It may be challenging to apply this model to images that contain non-textual information.

In some embodiments, both of the described above motion models may be applied, which may increase the reliability in motion estimation. Each of these models takes into consideration the distinctive feature of the scene depicted in an image, which contains a textual document. Thus, the two motion models, described above, may be combined into a single model. The combined model may be described with an equation (3), in which each motion model has weight. These weights may depend on one or more of the parameters: document type (e.g., document containing text), parameters of a camera capturing the images, etc. The motion vector for every point of image is determined as a weighted sum of the motion vectors from the first motion model and the second motion model:

$$V = k*V_1 + (1-k)*V_2$$

where k is a weighting parameter, which is empirically determined for different types of source documents, and V1, V2 are motion vectors of the first motion model and the second motion model respectively. Other motion models may be applied and included in the equation for computing the weighted motion vector. The computed weighted motion vector may be more reliable because it contains information that was received from different motion models.

As a result of applying bilinear interpolation, every pixel in the image (or frame) has its own unique motion vector slightly different from neighboring vectors. In other embodiments, the resulting image may be determined based on biqubic interpolation of signals of each point using motion vectors. After the process of motion compensation of the second image (or frame) to the first image (or frame) a resulting motion compensated image is generated.

An algorithm or method of quality enhancement may include the process of up-scaling (i.e., process of changing size of the image (or frame)). The increase in spatial resolution may be achieved using one or more methods, which can be applied during any one or more steps of the process shown in FIG. 2. One of the methods involves geometrical up-scaling of a single input image (or frame). A second method involves geometrical up-scaling of a single output high resolution image (or frame). A third method may involve geometrical up-scaling with pixel-wise motion compensation using biqubic interpolation. The procedure of biqubic interpolation in a higher resolution is performed once for each frame before the step of signal accumulation. The first processed image (or frame) may be up-scaled without motion, while the following image (or frame) may be up-scaled using motion vectors. "Noise-like ringing" artifacts that arise during biqubic interpolation procedure may be averaged and suppressed using an accumulation procedure. Accordingly, the resulting text image becomes more "smooth" and has an improved quality. In other words, the characters in textual blocks of resulting image are filtered out from noise, and edges of characters or symbols are smoothed.

At block 204, accumulation of signal is performed, which includes adding signal (information) from the currently processed image to the reference image (also called "accumulator image" herein). For example, the first image (or frame) from the series of captured images may be considered to be an accumulator image. An accumulator image may be considered as the image having the best quality of the images in the series of images.

According to one embodiment, signal accumulation is performed after each image in a series of images is compensated at step 203 for motion relative to the reference image. That is for each image in the series of images, motion estimation and motion compensation for motion relative to the selected reference image are performed. As a result, a new set of images (frames), which includes a single reference image and images that are motion compensated with respect to the reference image. Then, the motion compensated images and the reference image are averaged, and, as a result, one image is formed having the accumulated signal.

According to another embodiment, signal accumulation is performed subsequently at each step after motion compensation is performed. In this embodiment, an image-accumulator is selected from a series of images, in relation to which motion compensation will be performed of other images in the series of images. Then, another image is selected from the series of images, which is not the accumulator image. To this another image, the process of motion compensation is applied. As a result, a new compensated image is formed. Then, information from the formed compensated image may be added to the accumulator image. The accumulator image may be updated. Then, another image from the series of images is selected, and an image compensated relative the accumulator image is formed. Then, the new compensated image and the updated accumulator image are averaged. In this way, signal accumulation continues until a sufficient number of source images (i.e., images from the series of images) are be processed. As a result of signal accumulation, a single image with the accumulated signal is formed.

An accumulation of a signal may be performed by averaging signal obtained from the accumulator image and the currently analyzed image (or frame) using different weights. For uniform averaging among all the frames in the series the weight of the supplemented frame $W_n$ may be calculated as:

$$W_n = \frac{1}{n}$$

where n—is a number of supplemented frames.

The weight of accumulator image $W_a$ may be calculated according with the following equation:

$$W_a = 1 - W_n$$

In another embodiment, more complicated methods for signal accumulation may be used. These different methods take into account for every element (pixel) information about the supplemented image's surrounding neighbors in conjunction with the information received from the accumulator image (variance, local contrast value, etc.).

The result of processing of the accumulator image and currently processed image is transferred/displaced and accumulated in the accumulator image. The process of accumulation of information (following motion estimation and compensation) is then repeated for subsequent images (or frames) in the series of images.

As the result of the accumulation of N processed images (or frames), an output image is generated (205) having high resolution (and/or higher quality). For example, the quality of the output image may be estimated using peak signal-to-noise ratio or based on results of subsequent character recognition.

The results of signal accumulation may have an exponential nature. In other words, the largest quality increase of the output image may take place during accumulating of the first several images (e.g., the first 5-7 images (frames) in the series of images). After several iterations (e.g., after processing of 20 images), increase in quality becomes insignificant and may not be necessary. For faster and more effective accumulation of useful signal, the acquired images (frames) may be sorted by performing preliminary integrated assessment of their quality. The quality assessment of the images may take into consideration different types of defects (e.g., blur, defocusing, glare, etc.). After the images (frames) are sorted, the process of signal accumulation is started with the image having the highest quality being selected to serve as the accumulator image.

At step 206, optical or intelligent character recognition is applied to the generated accumulated image having high resolution. Due to high quality of the generated accumulated image, the recognition results are more accurate than results of recognition of the initially captured low resolution images. The resulting image may also be subjected to any other known methods for processing the text image. The single accumulated high resolution image may be recognized on electronic device or may be sent to a server where an OCR (ICR) system may process the image. The results of OCR (or ICR) processing is a word or word combinations represented by a string of characters.

Figure 3A:
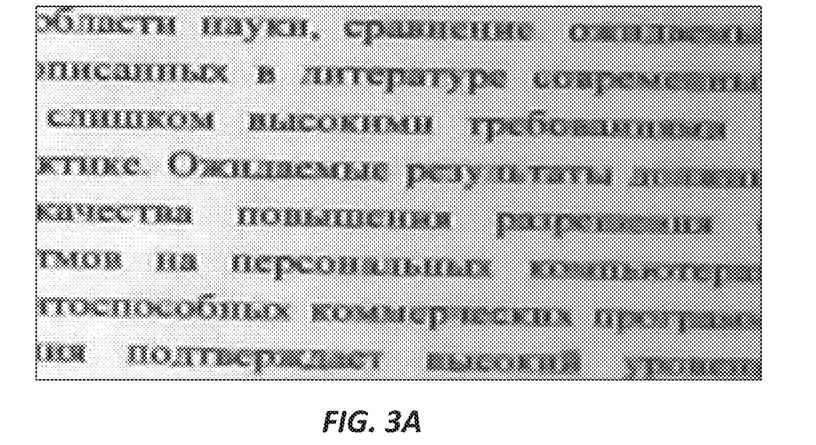
FIGS. 3A and 3B are illustrations of the same image area, in an accordance with an example implementation.
Figure 3B:
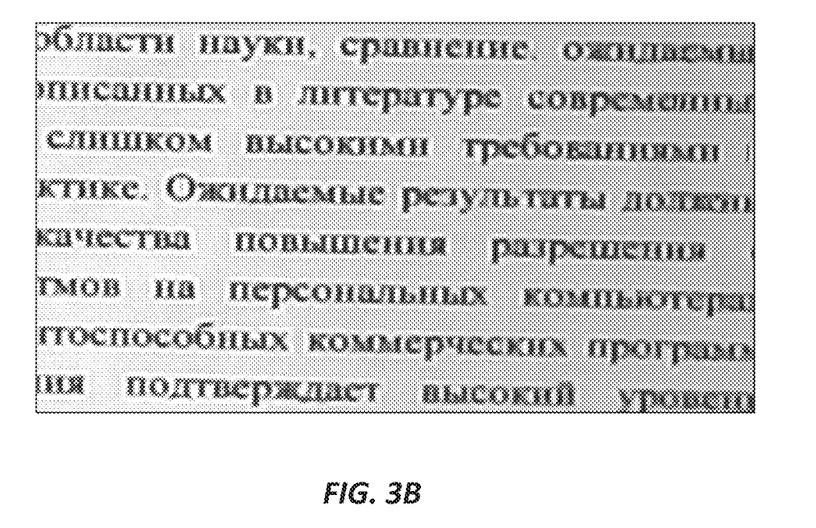

FIGS. 3A and 3B show the same area of a document image. FIG. 3A illustrates one of source images in the series of images (frames) captured using a camera of an electronic device. FIG. 3B illustrates an image obtained using the method illustrated in FIG. 2, which produced the displayed image which has a higher resolution than the image shown in FIG. 3A. As shown in FIGS. 3A and 3B, the image quality has increased significantly. Such increase in image quality significantly reduces errors during character recognition of the image.

Figure 4:
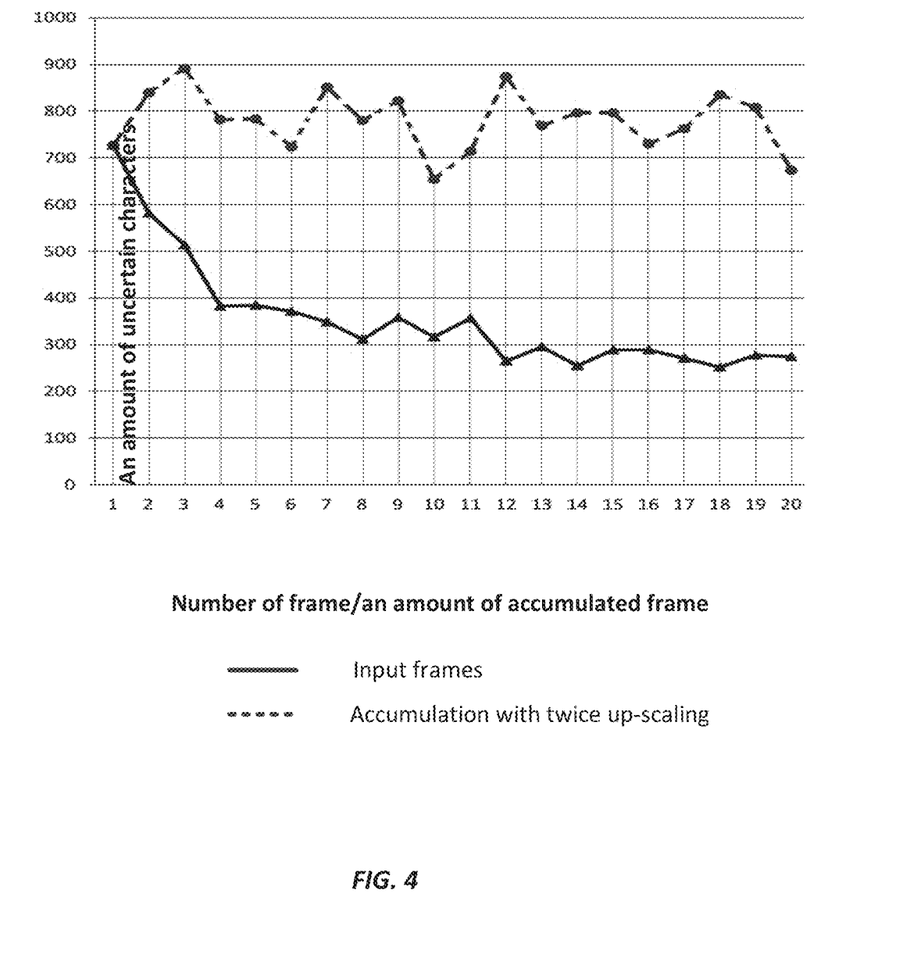
FIG. 4 is an illustration of a graph displaying the results of experiments of character recognition using original images with low resolution and generated images having higher resolution, in an accordance with an example implementation.

FIG. 4 illustrates a graph displaying results of an experiment of recognition of input frames (shown as solid line) acquired from a mobile device allowing for capturing of images with resolution of 1280×720 pixels, and recognition of frames (shown as dotted line) produced as a result of signal accumulation with up-scaling by two times. During the experiment, two motion models were applied. As shown in FIG. 4, the accumulation of the signal has exponential nature, in that the highest increase in quality of recognition occurs during accumulation of the first 5-8 frames, after which the process slows down, and after 20 frames, the increase in quality is insignificant and further accumulation does not make sense.

Figure 5:
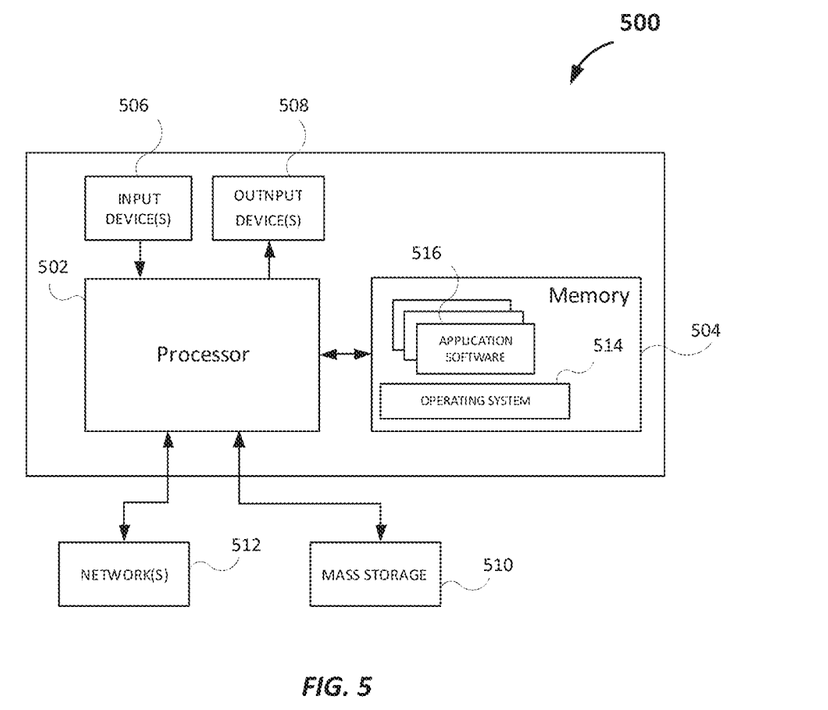
FIG. 5 shows one example of an electronic device, in accordance with an example implementation.

Referring to FIG. 5, an electronic device 500 is shown in accordance with described embodiments. The electronic device 500 includes at least one processor 502 coupled to a memory 504. The electronic device 500 includes input device(s) 506 (e.g., touchscreen) and output device(s) 508. The processor 502 may include one or more processors (e.g., microprocessors). The processor may include one or more CPUs. The memory 504 may include random access memory (RAM). The memory 504 can include other types of memory, including, but not limited to, hard disk drives, cache memories, non-volatile or back-up memories (e.g., programmable or flash memories), read-only memories, etc. The memory 504 may include memory storage located elsewhere in the electronic device 500 (e.g., any cache memory in the processor 502, storage used as a virtual memory and stored on a mass storage device 510).

The electronic device 500 may include a number of inputs and outputs for receiving information from external sources and for transmitting information externally. The user may utilize one or more input devices 506 (e.g., a keyboard, a mouse, imaging device, scanner, etc.) and one or more output devices 508 (e.g., a Liquid Crystal Display (LCD) panel, a sound playback device (speaker)) of the electronic device 500. The electronic device 500 may include at least one touch screen device (for example, a touch screen), an interactive whiteboard or any other device which allows the user to interact with a computer by touching areas on the screen.

For additional storage, the electronic device 500 may include one or more mass storage devices 510, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. The electronic device 500 may include an interface to one or more networks 512 (e.g., a local area network (LAN), a wide area network (WAN), a wireless network, and/or the Internet among others) to permit communication of information with other computing devices coupled to the networks. The electronic device 500 may include suitable analog and/or digital interfaces between the processor 502 and each of the components 504, 506, 508, and 512.

The electronic device 500 operates under the control of an operating system 514, and executes various computer software applications 516, components, programs, objects, modules, program instructions, etc. to implement the techniques described above. In particular, the computer software applications may include a client dictionary application and other installed applications for displaying text and/or text image content such a word processor, dedicated e-book reader etc. in the case of the client user device 102. Moreover, various applications, components, programs, objects, etc., collectively indicated by reference 516 in FIG. 5, may execute on one or more processors in another electronic device coupled to the electronic device 500 via the network 512, e.g., in a distributed computing environment, whereby the processing required to implement the functions of a computer program may be allocated to multiple computers over a network.

Implementations of the subject matter and the operations described in this specification can be implemented in digital electronic circuitry, computer software, firmware or hardware, including the structures disclosed in this specification and their structural equivalents or in combinations of one or more of them. Implementations of the subject matter described in this specification can be implemented as one or more computer programs, i.e., one or more modules of computer program instructions, encoded on one or more computer storage medium for execution by, or to control the operation of data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" includes a variety of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, a code that creates an execution environment for the computer program in question, e.g., a code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well. For example, feedback provided to the user can be any form of sensory feedback, e.g., visual feedback, auditory feedback, or tactile feedback and input from the user can be received in any form, including acoustic, speech, or tactile input. In addition, a computer can interact with a user by sending documents to and receiving documents from a device that is used by the user. For example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown, in sequential order or that all illustrated operations be performed to achieve desirable results. In certain circumstances, multitasking and parallel processing may be advantageous. Moreover, the separation of various system components in the implementations described above should not be understood as requiring such separation in all implementations and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for improving quality of recognition of objects in images, the method comprising:
   receiving a plurality of images, each image depicting same object;
   selecting a first image from the plurality of images;
   estimating motion of elements of the object in the first image relative to images in the plurality of images;
   based on results of motion estimation, performing motion compensation of elements of the one or more objects using the first image for the images in the plurality of images;
   accumulating signal from the compensated images into the first image resulting in a high resolution image; and
   performing object recognition using the resulting high resolution image.

2. The method of claim 1, wherein the estimating motion step further comprising:
   partitioning of each image into non-overlapping blocks of pixels;
   comparing blocks of pixels of a current image with corresponding blocks of pixels from the first image; and
   calculating motion vectors for each block of pixels, wherein a motion vector describes shift of a block between two images, wherein the shift, calculated for each block of pixels in an image, is estimated movement for a currently analyzed image.

3. The method of claim 2, wherein calculating motion vectors comprises using a multi-scale motion vector search method, wherein the multi-scale motion vector search method comprises calculating Gaussian pyramids.

4. The method of claim 2, further comprising removing from analysis unreliable blocks of pixels which do not satisfy a reliability criteria.

5. The method of claim 4, wherein a reliability criterion of a block is described by equation: $|V_C - \langle V \rangle| < T$, wherein $V_C$ is a motion vector of a currently analyzed block, $\langle V \rangle$ is a middle vector of neighboring blocks adjacent to the currently analyzed block, and T is a predetermined threshold value.

6. The method of claim 4, wherein a reliability criterion of a block is described by equation: $\text{Var}(I) \geq k\sigma$, wherein I is the variance of pixel intensity of an analyzed image, and $k\sigma$ is level of noise.

7. The method of claim 2, further comprising removing blocks of pixels that only contain background.

8. The method of claim 2, further comprising removing from motion vector calculation blocks of pixels located along image perimeter.

9. The method of claim 2, further comprising smoothing each vector motion component for removal of noise from a field of motion vectors by using a filter.

10. The method of claim 2, further comprising applying bilinear interpolation to the motion vectors.

11. The method of claim 2, further comprising:
    removing from calculation of motion vectors unreliable blocks of pixels, wherein the unreliable blocks of pixels do not satisfy reliability criteria;
    substituting each of the removed blocks of pixels with a block whose pixel components are calculated based on information of neighboring reliable blocks of pixels using an interpolation method.

12. The method of claim 1, further comprising stabilizing a device that captured the plurality of images.

13. The method of claim 1, wherein the images are sequentially compensated for motion, and wherein signal accumulation is performed on compensated images.

14. The method of claim 1, wherein the step of performing motion compensation comprises calculating a plurality of motion vectors, and a selecting a motion vector from the plurality of motion vectors.

15. The method of claim 14, wherein the motion vector is selected based on a block matching algorithm, wherein the block matching algorithm describes combination of a block of pixels from a currently analyzed image with a corresponding block in the first image.

16. The method of claim 15, wherein the block matching algorithm is based on resulting values of an evaluation metric.

17. The method of claim 15, wherein selecting the motion vector from the plurality of motion vectors is based on criteria of best combination of blocks of pixels, the selected motion vector providing the selected motion vector using a selected difference metric.

18. The method of claim 1, wherein the steps of estimating motion and motion compensation further comprise:
    comparing current image with the selected first image;
    creating a compensated image through signal compensation based on the pairwise comparison.

19. The method of claim 1, further comprising calculating motion vectors using a model of perspective motion transformation.

20. The method of claim 1, further comprising increasing resolution by changing image size.

21. The method of claim 20, wherein the resolution is increased using a geometric increase of a source image.

22. The method of claim 20, wherein the increase in resolution is achieved by increase using geometric up-scaling with by-pixel motion compensation using bicubic interpolation.

23. The method of claim 22, wherein the geometric increase with by-pixel motion compensation using the bicubic interpolation comprises:
increasing a first processed image from the plurality of images without motion; and
increasing subsequent images with motion vectors.

24. The method of claim 1, further comprising: sorting the images from the plurality of images using initial estimate of quality of each image based on a number of defects contained in an image, wherein an image with highest quality is selected as the first image.

25. The method of claim 1, wherein determining signal accumulation of the object includes adding information from currently analyzed image into the first image, wherein the first image is a first captured image from the plurality of images.

26. The method of claim 1, wherein signal accumulation of the object includes averaging a signal obtained from the first image and currently analyzed image from the plurality of images using weights.

27. The method of claim 1, wherein accumulating signal of the object further includes adding results of processing the first image and currently analyzed image into the first image.

28. A system comprising:
one or more data processors; and
one or more storage devices storing instructions that, when executed by the one or more data processors, cause the one or more data processors to perform operations comprising:
receiving a plurality of images, each image depicting same object;
selecting a first image from the plurality of images;
estimating motion of elements of the object in the first image relative to images in the plurality of images;
based on results of motion estimation, performing motion compensation of elements of the one or more objects using the first image for the images in the plurality of images;
accumulating signal from the at least some compensated images into the first image resulting in a high resolution image; and
performing object recognition using the resulting high resolution image.

29. The system of claim 28, wherein the estimating motion step further comprising:
partitioning of each image into non-overlapping blocks of pixels;
comparing blocks of pixels of a current image with corresponding blocks of pixels from the first image; and
calculating motion vectors for each block of pixels, wherein a motion vector describes shift of a block between two images, wherein the shift, calculated for each block of pixels in an image, is estimated movement for a currently analyzed image.

30. The system of claim 29, wherein calculating motion vectors comprises using a multi-scale motion vector search method, wherein the multi-scale motion vector search method comprises calculating Gaussian pyramids.

31. The system of claim 29, further comprising removing from analysis unreliable blocks of pixels which do not satisfy reliability criteria.

32. The system of claim 31, wherein a reliability criterion of a block is described by equation: $|V_C - \langle V \rangle| < T$, wherein $V_C$ is a motion vector of a currently analyzed block, $\langle V \rangle$ is a middle vector of neighboring blocks adjacent to the currently analyzed block, and T is a predetermined threshold value.

33. The system of claim 31, wherein a reliability criterion of a block is described by equation: $\mathrm{Var}(I) \geq k\sigma$, wherein I is the variance of pixel intensity of an analyzed image, and $k\sigma$ is level of noise.

34. The system of claim 28, further comprising stabilizing a device that captured the plurality of images.

35. The system of claim 29, further comprising removing blocks of pixels that only contain background.

36. The system of claim 29, further comprising removing from motion vector calculation blocks of pixels located along image perimeter.

37. The system of claim 29, further comprising smoothing each vector motion component for removal of noise from a field of motion vectors by using a filter.

38. The system of claim 29, further comprising applying bilinear interpolation to the motion vectors.

39. The system of claim 29, further comprising:
removing from calculation of motion vectors unreliable blocks of pixels, wherein the unreliable blocks of pixels do not satisfy reliability criteria;
substituting each of the removed blocks of pixels with a block whose pixel components are calculated based on information of neighboring reliable blocks of pixels using an interpolation method.

40. The system of claim 28, wherein the images are sequentially compensated for motion, and wherein signal accumulation is performed on compensated images.

41. A non-transitory computer-readable storage medium having machine instructions stored therein, the instructions being executable by a processor to cause the processor to perform operations comprising:
receiving a plurality of images, each image depicting same object;
selecting a first image from the plurality of images;
estimating motion of elements of the object in the first image relative to images in the plurality of images;
based on results of motion estimation, performing motion compensation of elements of the one or more objects using the first image for the images in the plurality of images;
accumulating signal from the compensated images into the first image resulting in a high resolution image; and
performing object recognition using the resulting high resolution image.

* * * * *